(12) United States Patent
Argento

(10) Patent No.: US 11,731,592 B1
(45) Date of Patent: Aug. 22, 2023

(54) SNOW AND ICE REMOVAL TOOL

(71) Applicant: Antonio Argento, Montreal (CA)

(72) Inventor: Antonio Argento, Montreal (CA)

( * ) Notice: Subject to any disclaimer, the term of this patent is extended or adjusted under 35 U.S.C. 154(b) by 0 days.

(21) Appl. No.: 17/345,223

(22) Filed: Jun. 11, 2021

(51) Int. Cl.
  *B60S 3/00* (2006.01)
  *B60S 3/04* (2006.01)
  *A46B 5/00* (2006.01)
  *A46B 15/00* (2006.01)
  *A47L 13/12* (2006.01)

(52) U.S. Cl.
  CPC ............. *B60S 3/045* (2013.01); *A46B 5/005* (2013.01); *A46B 15/00* (2013.01); *A47L 13/12* (2013.01)

(58) Field of Classification Search
  CPC ..... B60S 3/045; A46B 5/005; A46B 15/0095; A46B 15/0081; A46B 2200/3046; A46B 15/00; A47L 13/12
  USPC .............................................. 15/111, 236.05
  See application file for complete search history.

(56) References Cited

U.S. PATENT DOCUMENTS

| | | | |
|---|---|---|---|
| 4,302,862 A | | 12/1981 | Machacek et al. |
| 6,481,041 B1 * | | 11/2002 | Ingram ................... B60S 3/045 |
| | | | 15/144.1 |
| 6,575,511 B2 | | 6/2003 | Hultstrand |
| 6,662,399 B1 * | | 12/2003 | Vairo .................... A47L 13/022 |
| | | | 15/236.01 |
| 9,345,214 B1 * | | 5/2016 | Lively ...................... A01H 5/10 |
| 2003/0146632 A1 * | | 8/2003 | Marion ................... B60S 3/045 |
| | | | 294/51 |
| 2019/0328125 A1 * | | 10/2019 | Lafleur ..................... A47L 1/06 |

* cited by examiner

*Primary Examiner* — Katina N. Henson
(74) *Attorney, Agent, or Firm* — Sanchelima & Associates, P.A.; Christian Sanchelima; Jesus Sanchelima

(57) ABSTRACT

A snow and ice removal tool including a brush assembly, a handle assembly, and a vehicle assembly. These assemblies in conjunction with one another provide a simple solution to snow and ice buildup on vehicles. The snow and ice removal tool is a multi-tool comprising an elongated handle including a rubber mallet on one end. On the opposite end of the elongated handle is a scraper blade as well as a brush integrally formed adjacent to the scraper blade. The scraper blade and brush can be used to remove snow and ice from the surface of the vehicle. The rubber mallet can be used to knock snow build up from the under carriage of vehicles.

1 Claim, 3 Drawing Sheets

SNOW AND ICE REMOVAL TOOL

BACKGROUND OF THE INVENTION

1. Field of the Invention.

The present invention relates to a snow and ice removal tool and, more particularly, to a snow and ice removal tool that includes multiple tools in one.

2. Description of the Related Art.

Several designs for a snow and ice removal tool have been designed in the past. None of them, however, include an elongated handle having a rubber mallet opposite a scraper blade.

Applicant believes that a related reference corresponds to U.S. Pat. No. 6,575,511 issued for a tool for removing ice and snow from a wheel well of a vehicle. Applicant believes that another related reference corresponds to U.S. Pat. No. 4,302,862 issued for a snow and ice removal tool having a scraping blade and a brush head. None of these references, however, teach of a snow and ice removal tool with multi-fun tools such as an elongated handle, a rubber mallet, a spike, and a scraper blade.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a snow and ice removal multitool that includes an elongated handle with a rubber mallet.

It is another object of this invention to provide a snow and ice removal multitool that includes a scraper blade at a distal end.

It is still another object of the present invention to provide a snow and ice removal multitool that includes a brush integrally formed adjacent to the scraper blade.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
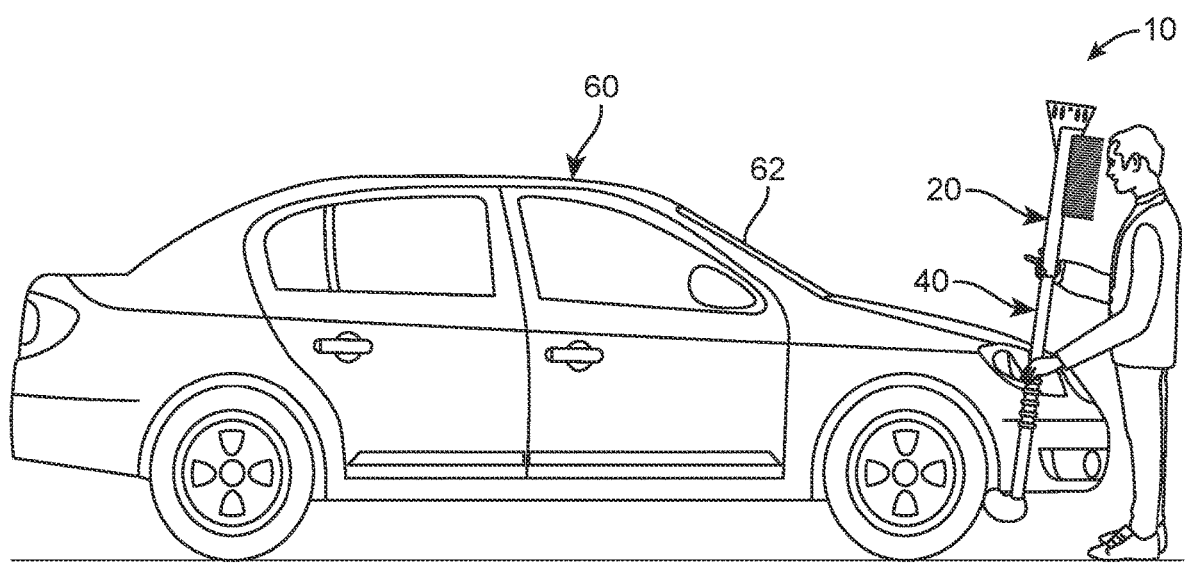
FIG. 1 represents an operational view of the present invention 10 being used on a vehicle 62.

Referring now to the drawings, where the present invention is generally referred to with numeral 10, it can be observed that it basically includes a brush assembly 20, a handle assembly 40, and a vehicle assembly 60.

Figure 2:
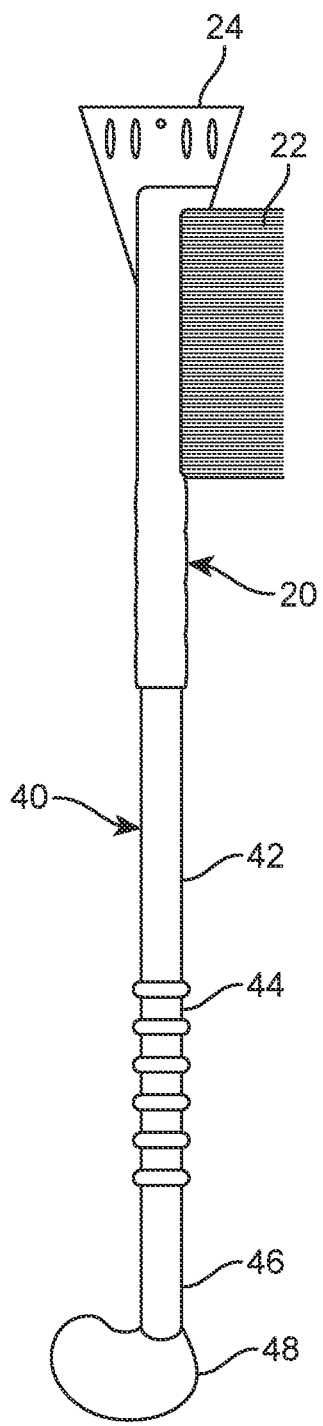
FIG. 2 shows a front view of brush assembly 20 mounted to handle assembly 40.
Figure 4:
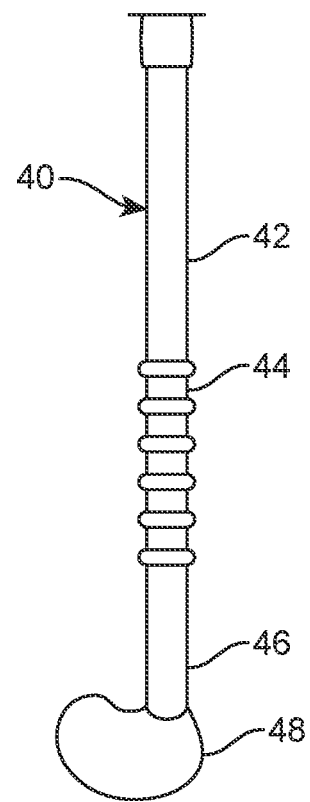
FIG. 4 is a representation of an enlarged front view of the handle assembly 40 depicted in FIG. 2.

Best shown in FIGS. 2 and 4, the handle assembly may include an elongated handle 42. The elongated handle 42 may be a cylindrical rod. It may be suitable for the elongated handle 42 to be made out of a rigid light weight material such as aluminum or plastic. The elongated handle 42 may include a top end and a bottom end. The bottom end of the elongated handle 42 may include a grip 44 mounted thereon. The grip 44 may be made out of a foam, plastic, rubber, latex, PVC, or vinyl material. Protruding about the perimeter of the grip 44 may be a plurality of evenly spaced ridges. The grip 44 may allow for the user to be able to control the present invention 10 in cold and wet operating conditions. The grip 44 may be circumferentially mounted about the bottom end of the elongated handle 42 and extend to an attachment member 46.

It may be preferable for the grip 44 to be mounted adhesively to prevent said grip 44 from sliding along a length of the elongated handle 42 while in use. Located at a grip bottom edge may be an attachment member 46. The attachment member 46 may be a secondary cylindrical rod including a mallet 48 mounted to a secondary rod bottom end. The mallet 48 may be made out of a foam, plastic, rubber, latex, PVC, or vinyl material as well. It may be suitable for the mallet 48 to include a rounded protrusion extending perpendicularly and curling upwards with respect to the attachment member 46. In an alternate embodiment the attachment member 46 may be curled to allow for a further reach underneath the vehicle 62. As demonstrated in FIG. 1, the mallet 48 may allow for the user to swing the handle assembly 40 towards the undercarriage of a vehicle 62 to remove any snow and ice that has accumulated thereon.

Figure 3:
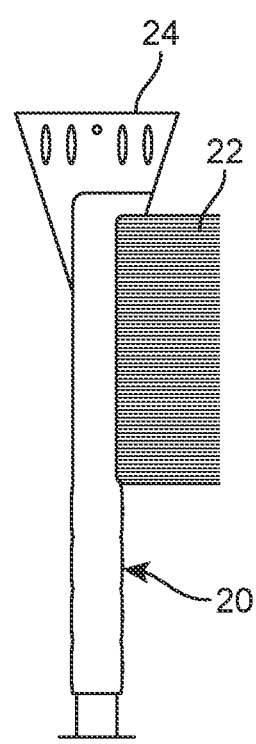
FIG. 3 illustrates an enlarged front view of the brush assembly 20 seen in FIG. 2.

As best illustrated in FIG. 2-3 the brush assembly 20 may include a brush 22 mounted to a top portion of the elongated handle 42. The brush 22 may include a cylindrical portion with bristles extending perpendicularly from a top portion. The brush 22 in conjunction with the grip 44 may allow the user to brush ice and snow off of the surface of a vehicle 62 from vehicle assembly 60. The brush 22 may include a scraper 24 extending from the top edge therefrom. The scraper 24 may be a flattened triangular member with multiple oblong apertures lining an interior portion. It may be suitable for the scraper 24 to be made out of a rigid material. The rigidity of the scraper 24 may help the user remove ice that has formed on the vehicle 62 that would otherwise be difficult to remove using the brush 22 or mallet 48. The use of the present invention 10 to remove ice and snow from a vehicle 62 by a user not only protects them from possible dangerous situations while on the road but protects other people as well. It is important for a user to be able to remove ice and snow buildup a vehicle 62 to help ensure clearer visibility and better maneuverability while on the road. Thereby making roads a safer place for the user as well as others.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A snow and ice removal tool, consisting of:

a. a handle assembly including an elongated handle having a cylindrical body with a handle top end and a handle bottom end, said elongated handle is made of aluminum, wherein said elongated handle has a cylindrical shape and includes an attachment member located at the handle bottom end being concentrical thereof, the attachment member being cylindrical and having a mallet mounted to an attachment member bottom end, the mallet being a rounded protrusion extending perpendicularly and curling upwards with respect to the attachment member, the mallet being made out of a rubber material, wherein said mallet is configured to remove ice and snow buildup from underneath a vehicle, therebetween said attachment member and said handle bottom end there is a grip made of foam having ridges disposed vertically thereon wherein the ridges are evenly spaced, said ridges extend past a periphery of said grip, each of said ridges is annular shaped, said elongated handle being greater in length than said grip, said grip is larger in length than said attachment member, said grip is proximal to said mallet, said grip is circumferentially mounted about said handle bottom end and extend to said attachment member, said grip is adhesively mounted thereon; and b. a brush assembly including a brush integrally formed adjacent to a scraper, wherein said brush extends laterally therefrom, said brush assembly is connected to said elongated handle at said handle top end, said brush assembly having a diameter greater than the diameter exhibited by the elongated handle, wherein said scraper extends from a brush top end of said brush assembly, said scrapper having an inverted flattened triangular shape, said scraper having four oblong apertures lining an interior portion and are proximal to a top distal end thereof, said brush and said scraper are orthogonal with respect to each other, said scraper further including multiple oblong apertures lining an interior portion passing through a body of said scraper, said brush and said mallet are facing opposite directions with respect to each other.

\* \* \* \* \*